United States Patent [19]
MacLellan et al.

[11] Patent Number: 5,649,296
[45] Date of Patent: Jul. 15, 1997

[54] FULL DUPLEX MODULATED BACKSCATTER SYSTEM

[75] Inventors: John Austin MacLellan, Aberdeen; R. Anthony Shober, Red Bank; Giovanni Vannucci, Middletown; Gregory Alan Wright, Colts Neck, all of N.J.

[73] Assignee: Lucent Technologies Inc., Murray Hill, N.J.

[21] Appl. No.: 492,174

[22] Filed: Jun. 19, 1995

[51] Int. Cl.⁶ .................... H04B 1/40; H04B 1/59
[52] U.S. Cl. ............ 455/38.2; 455/106; 455/73; 455/517; 342/51; 370/280
[58] Field of Search ................ 455/38.2, 49.1, 455/54.1, 54.2, 73, 106, 19; 340/572, 573, 825.54; 342/44, 51, 50; 370/18, 95.3

[56] References Cited

U.S. PATENT DOCUMENTS

| | | | |
|---|---|---|---|
| 4,075,632 | 2/1978 | Baldwin et al. | 343/6.8 R |
| 4,360,810 | 11/1982 | Landt | 343/6.8 R |
| 5,124,985 | 6/1992 | Hoshikawa | 455/54.1 |
| 5,252,979 | 10/1993 | Nysen | 370/53 |
| 5,317,309 | 5/1994 | Vercellotti et al. | 340/825.54 |
| 5,430,441 | 7/1995 | Bickley et al. | 340/825.54 |

FOREIGN PATENT DOCUMENTS

WO8904093  8/1989  European Pat. Off. .

*Primary Examiner*—Chi H. Pham
*Attorney, Agent, or Firm*—John A. Caccuro

[57] ABSTRACT

A duplex radio communication system includes an Interrogator which generates a first modulated signal by modulating a first information signal onto a radio carrier signal. The Interrogator transmits the first modulated signal to at least one remote Tag of the system. The remote Tag receives and processes the first modulated signal received at its Antenna. A Backscatter Modulator uses a second information signal to modulate the reflection of the first modulated signal from the Antenna, the reflected signal being a second modulated signal. The Interrogator receives and demodulates the second modulated signal to obtain the second information signal.

22 Claims, 6 Drawing Sheets

FULL DUPLEX MODULATED BACKSCATTER SYSTEM

RELATED APPLICATIONS

Related subject matter is disclosed in the following application filed concurrently herewith and assigned to the same Assignee hereof: U.S. patent application Ser. No. 08/492,173, entitled "Dual Mode Modulated Backscatter System," inventors R. Anthony Shober, Giovanni Vannucci, and Gregory A. Wright.

1. Field of the Invention

This invention relates to wireless communication systems and, more particularly, to a wireless communication system using modulated backscatter technology.

2. Background of the Invention

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. The objectives of RFID systems are to design a reliable, secure, novel architecture and to minimize the total cost of the Interrogator and the Tags, while meeting the system performance requirements. In RFID systems, the Interrogator communicates to the Tags using modulated radio signals, and the Tags respond with modulated radio signals. Most commonly, this communication utilizes Time-Division Duplex (TDD) or Half Duplex techniques. After transmitting a message to the Tag, the Interrogator then transmits a Continuous-Wave (CW) radio signal to the Tag. The Tag then modulates the CW signal using modulated backscattering (MBS) where the antenna is electrically switched, by the modulating signal, from being an absorber of RF radiation to being a reflector of RF radiation.

Prior art in MBS technology is described in U.S. Pat. Nos. 4,075,632, issued Feb. 21, 1978 to H. A. Baldwin et al. and entitled "Interrogation, And Detection System," and 4,360,810, issued Nov. 23, 1982 to J. A. Landt and entitled "Multichannel Homodyne Receiver". MBS systems typically utilize the amplitude modulated techniques described above for communications from the Interrogator to the Tag, and utilize MBS for communications from the Tag to the Interrogator.

Prior art maintains that communications in MBS systems is Half Duplex or Time-Division Duplex (TDD). By Half Duplex, we mean that the Interrogator to Tag communications (e.g., using amplitude modulation) are done during a certain period of time, and the Tag to Interrogator communications, using MBS, are done during another period of time.

What is desired is an MBS system that operates in a Full Duplex (FD) manner. In an FD system, both the Interrogator and Tag can transmit continuously and during the same time period. Some advantages of an FD system include ease of maintaining time slot synchronization and increased total system data throughput.

SUMMARY OF THE INVENTION

In accordance with the present invention, a duplex radio communication system comprises an Interrogator which generates a first modulated signal by modulating a first information signal onto a radio carrier signal. The modulation type is selected from a group including amplitude, phase, frequency, time-division, or code-division modulation. The Interrogator transmits the first modulated signal to at least one remote Tag of the system. The remote Tag receives and processes the received first modulated signal. A Backscatter Modulator uses a second information signal to modulate the reflection of the first modulated signal, the reflected signal being a second modulated signal. The Interrogator receives and demodulates the second modulated signal to obtain the second information signal. In one embodiment, demodulation utilizes a homodyne detector and the first modulated signal as the frequency source for the detector.

DETAILED DESCRIPTION

RFID system applications exist which have very different data rate requirements for the Downlink (Interrogator to Tag) and the Uplink (Tag to Interrogator) directions. One such class of applications involves using RFID technology to read information from a Tag affixed to a container or pallet. In this application, the container is moved (by being pulled by a small truck) across the reading field of an Interrogator. The reading field is defined as that volume of space within which a successful transaction can take place. While the Tag is in the reading field, the Interrogator to Tag transaction must be completed. Since the Tag is moving through the reading field, the RFID system has only a limited amount of time to successfully complete the transaction.

In such an application, the Tag could be moving as fast as 10 meters/second through the reading field. The reading field would consist of a roughly conical volume, extending 5 meters away from the Interrogator, and the cone having an angle of roughly 60 degrees total spread (30 degrees to either side of a direct path from the Interrogator to a point immediately in front of the Interrogator). Given this situation, the RFID communications with each Tag must be completed in less than about 0.2 seconds.

Therefore, effective RFID systems must be able to a) have the Tag detect the presence of the Interrogator in a very short period of time, and b) have the Tag to Interrogator data rate be sufficiently large such that the communications can be completed within the time period available. Furthermore, the system must work even if several Tags are in the reading field at the same time. Given these constraints, an Uplink data rate of 50 Kbps, or perhaps greater, may be desirable.

Another application of this RFID system calls for the Tag to be interrogated at distances significantly greater than 5 meters, with the same Downlink signal used by Interrogators serving these various applications. To support this greater range, the Downlink data rate must be limited to keep the signal-to-noise ratio acceptable. An example of these alternative applications was discussed in pending U.S. patent application Ser. No. 08/206,075, entitled "Modulated Backscatter Wireless Communication System Having An Extended Range," now abandoned in which Tags were used as Electronic Shelf Labels to display correct prices on a supermarket shelf. In this application, Downlink data rates of about 1 Kbps are used; in addition, the Uplink bit rate must be limited to maintain acceptable radio coverage.

Therefore, an object of the present invention is an RFID system that achieves synchronization rapidly, even with a relatively low-speed Downlink and having a relatively high-speed Uplink to send the necessary Tag data rapidly even in the presence of multiple Tags in the reading field. To accomplish this object, the RFID system of the present invention utilizes Modulated Backscatter technology that operates in a Full Duplex manner.

Figure 1:
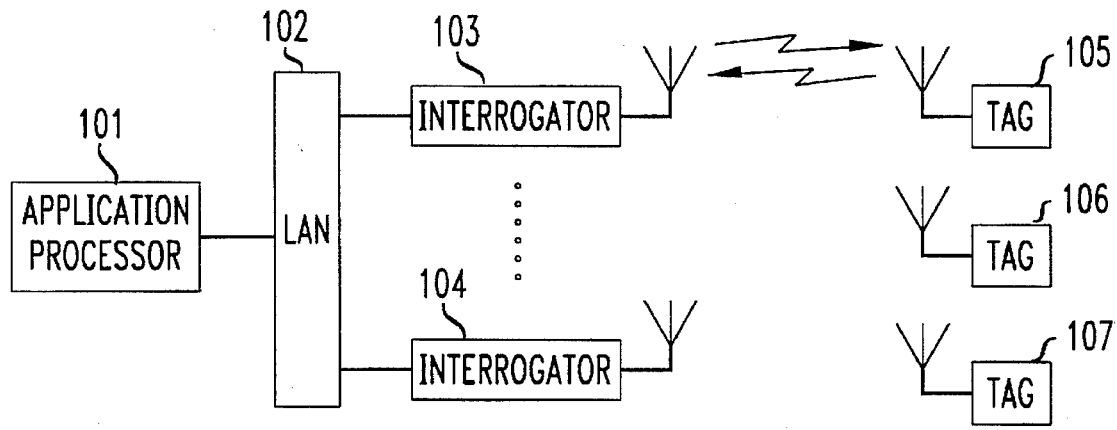
FIG. 1 shows a block diagram of an illustrative Radio Frequency Identification (RFID) system.
Figure 2:
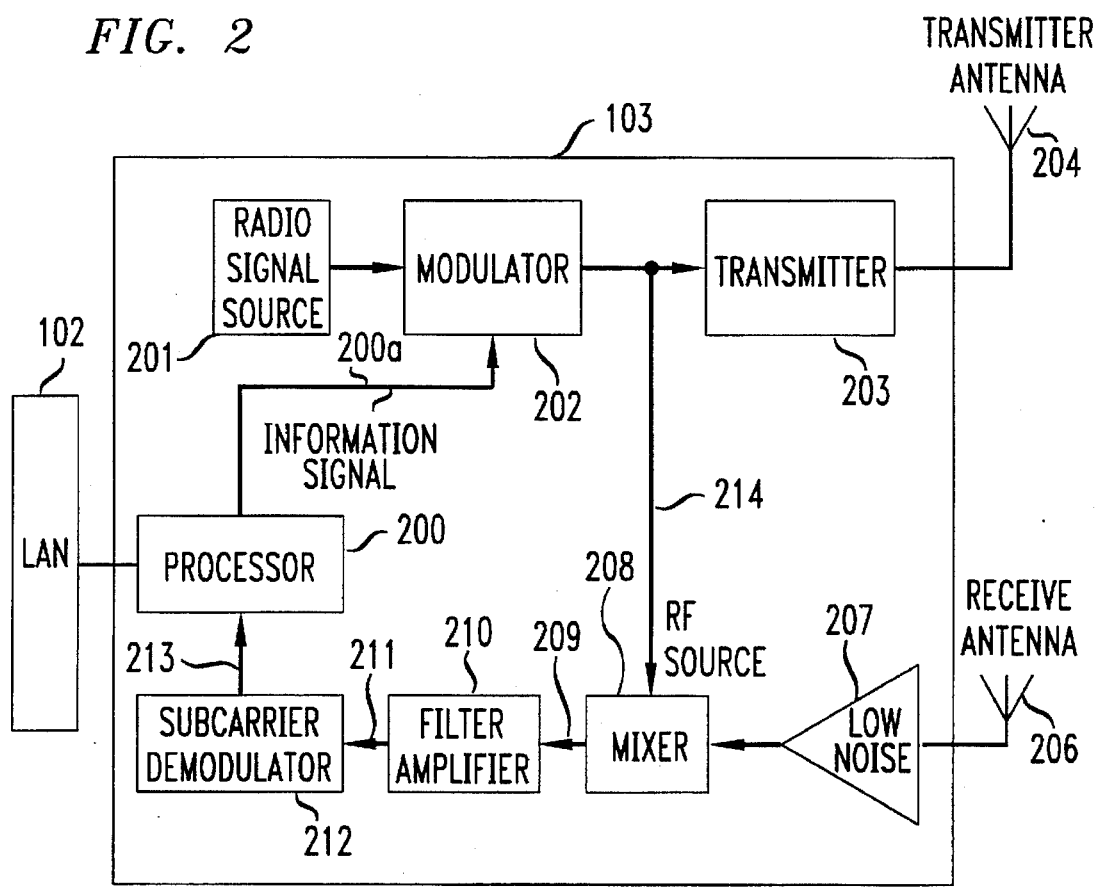
FIG. 2 shows a block diagram of an illustrative Interrogator Unit used in the RFID system of FIG. 1.

With reference to FIG. 1, there is shown an overall block diagram of an illustrative RFID system useful for describing the application of the present invention. An Application Processor 101 communicates over Local Area Network (LAN) 102 to a plurality of Interrogators 103–104. The Interrogators may then each communicate with one or more of the Tags 105–107. For example, the Interrogator 103 receives an information signal, typically from an Application Processor 101. The Interrogator 103 takes this information signal and Processor 200 (FIG. 2) properly formats a downlink message (Information Signal 200a) to be sent to the Tag. With joint reference to FIGS. 1 and 2, Radio Signal Source 201 synthesizes a radio signal, the Modulator 202 modulates the Information Signal 200a onto the radio signal, and the Transmitter 203 sends this modulated signal via Antenna 204, illustratively using amplitude modulation, to a Tag. The reason amplitude modulation is a common choice is that the Tag can demodulate such a signal with a single, inexpensive nonlinear device (such as a diode).

Figure 3:
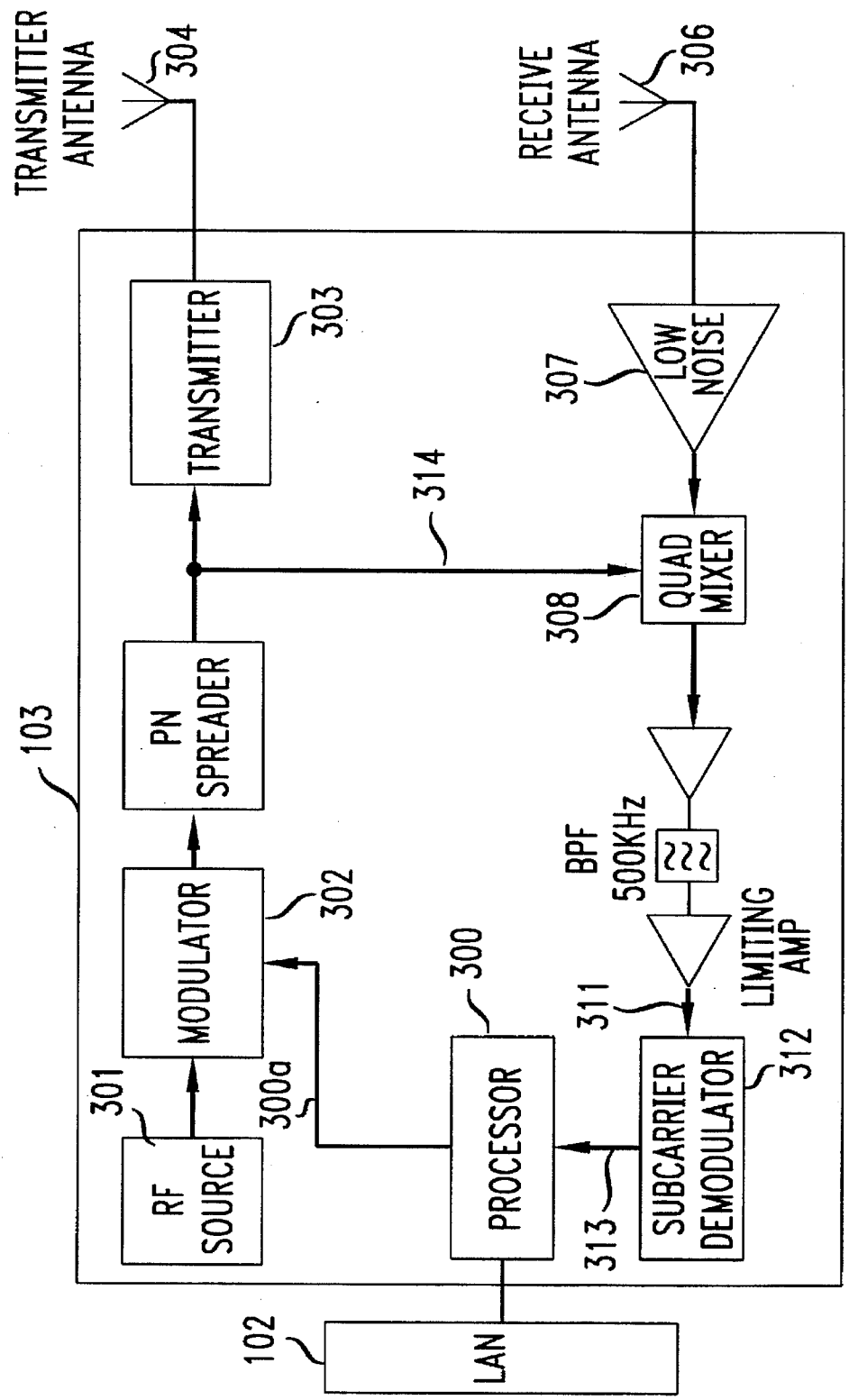
FIG. 3 shows a block diagram of a wideband (DS/SS) embodiment of the Interrogator Unit used in the RFID system of FIG. 1.

With reference to FIG. 3, there is shown an overall block diagram of a wideband RFID system. The Modulator 302 modulates the Information Signal onto the Radio Signal CRF Source) 301 and then the modulated Radio Signal is sent, in this example, to a PN Code Spreader 302a. The Code Spreader increases the modulation bandwidth N-fold (N is the number of chips per bit), which mitigates many of the undesirable effects of multipath fading of the radio channel. The output of the Code Spreader is sent to both the Transmitter 303 and the Quad Mixer 308 of the Receiver section; illustratively, this is a Direct Sequence Spread Spectrum (DS/SS) system. One advantage of this implementation is that the Receiver has perfect knowledge of the PN sequence and can reduce the received signal bandwidth back to a narrowband signal for modulation. The Receiver section of FIG. 3 operates similarly to that of FIG. 2 except that it substitutes Amplifier 309, Bandpass Filter 310, and Limiting Amplifier 310a for Filter Amplifier 210 of FIG. 2.

Figure 4:
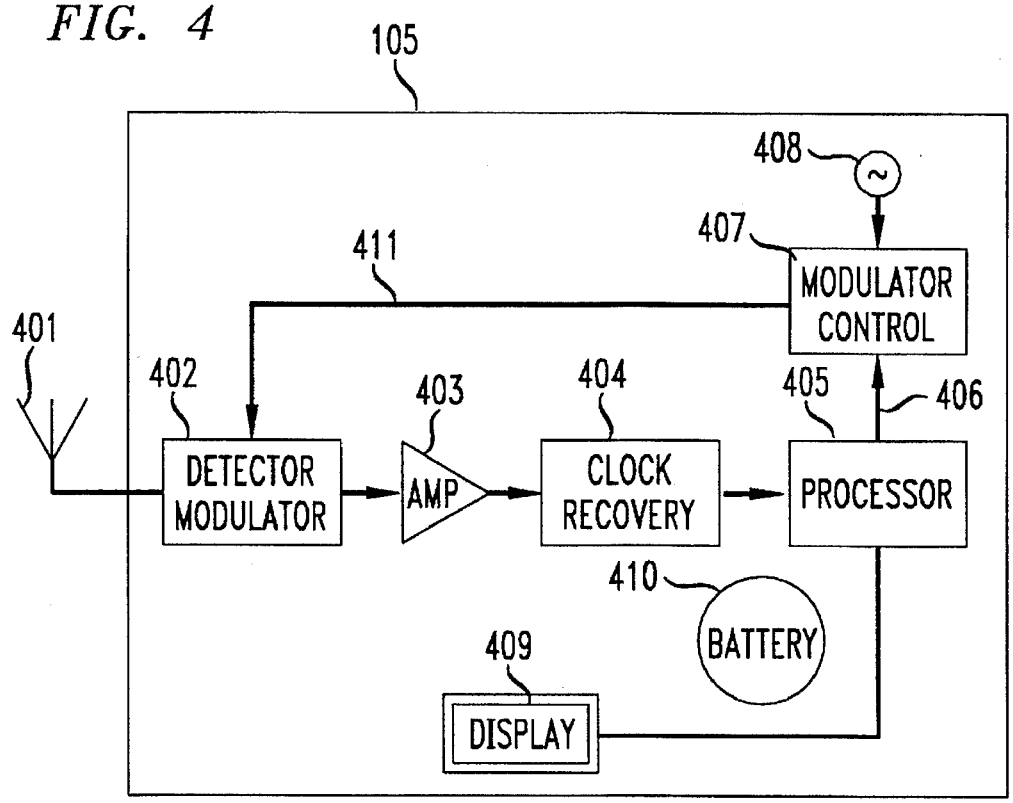
FIG. 4 shows a block diagram of a Tag Unit used in the RFID system of FIG. 1.

In the Tag 105 (see FIG. 4), the Antenna 401 (frequently a loop or patch antenna) receives the modulated signal. This signal is demodulated, directly to baseband, using the Detector/Modulator 402, which, illustratively, could be a single Schottky diode. The diode should be appropriately biased with the proper current level in order to match the impedance of the diode and the Antenna 401 such that losses of the radio signal are minimized. The result of the diode detector is essentially a demodulation of the incoming signal directly to baseband. The Information Signal 200a is then amplified, by Amplifier 403, and synchronization recovered in Clock Recovery Circuit 404. The Clock Recovery Circuit 404 can be enhanced by having the Interrogator send the amplitude modulated signal using Manchester encoding. The resulting information is sent to a Processor 405. The Processor 405 is typically an inexpensive 4- or 8-bit microprocessor; the Clock Recovery Circuit 404 can be implemented in an ASIC (Applied Specific Interpreted Circuit) which works together with Processor 405. This Processor 405 can also serve as the driver for an optional Display Unit 409 should this Tag require a display. The Processor 405 generates an Information Signal 406 to be sent from the Tag 105 back to the Interrogator (e.g., 103). This Information Signal 406 is sent to a Modulator Control Circuit 407, which uses the Information Signal 406 to modulate a subcarrier frequency generated by the subcarrier Frequency Source 408. The Frequency Source 408 could be a crystal oscillator separate from the Processor 405, or it could be a frequency source derived from signals present inside the Processor 405—such as a multiple of the fundamental clock frequency of the Processor. The Modulated Subcarrier Signal 411 is used by Detector/Modulator 402 to modulate the modulated signal received from Tag 105 to produce a modulated backscatter (e.g., reflected) signal. This is accomplished by switching on and off the Schottky diode using the Modulated Subcarrier Signal 411, thereby changing the reflectance of Antenna 401. A Battery 410 or other power supply provides power to the circuitry of Tag 105.

Figure 5:
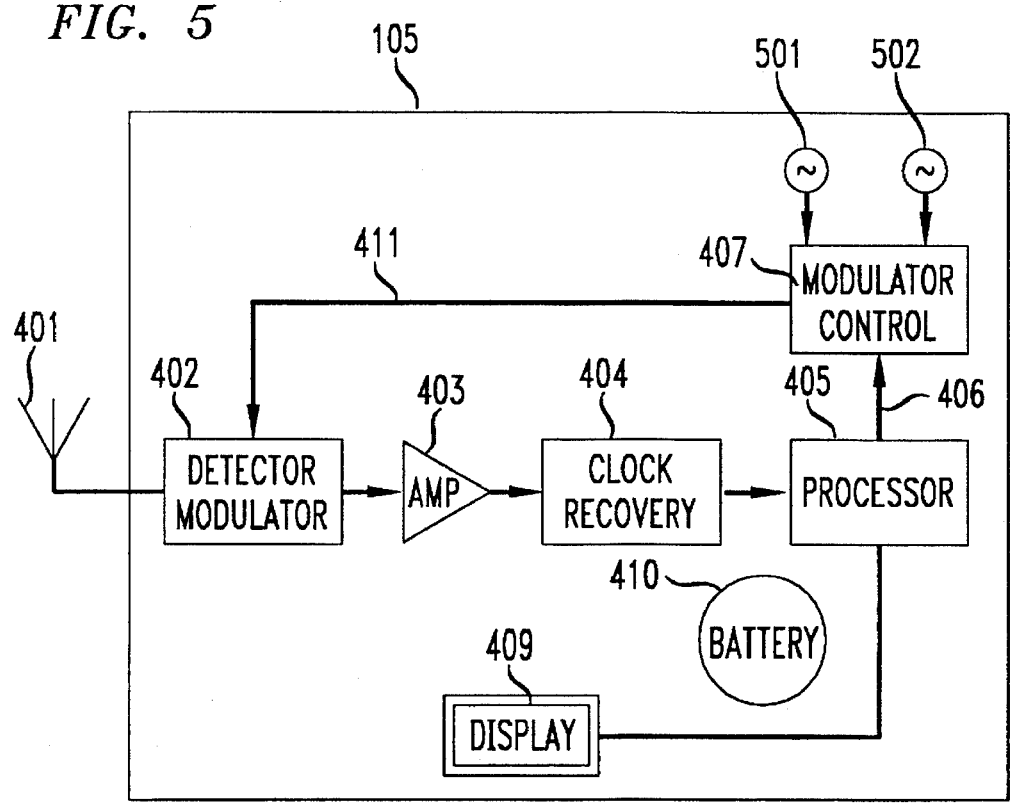
FIG. 5 shows a block diagram of an alternate embodiment of a Tag Unit used in the RFID system of FIG. 1.

There are a variety of techniques for using Modulated Backscatter (MBS) to send information from the Tag to the Interrogator. In some MBS technologies, the Modulator Control Circuit 407 of the Tag generates an amplitude modulated signal modulated at an Information Signal 406 frequency $f_2$. If the Radio Signal Source 201 generates a CW frequency $f_1$, then the Interrogator receives signals inside of the range $(f_1-f_2)$ to $(f_1+f_2)$, and filters out signals outside of that range. This approach could be termed the "MBS at baseband" approach. Another approach would be for the Tag to generate two subcarrier frequencies, generated by Frequency Sources 501 and 502, as shown in FIG. 5. The information could be conveyed in a frequency-shift keyed (FSK) fashion with the subcarrier frequency transitioning between these two frequencies. Other modulation schemes are possible as well, such as Phase Shift Keying (PSK) of a single subcarrier frequency (e.g., BPSK, QPSK) or other complex modulation schemes (e.g., MFSK, MASK, etc.).

Returning to FIG. 2, the Interrogator 103 receives the reflected and modulated signal with the Receive Antenna 206, amplifies the signal with a Low Noise Amplifier 207, and demodulates the signal using homodyne detection in a Quadrature Mixer 208 down to the Intermediate Frequency (IF) of the single subcarrier. (In some Interrogator designs, a single Transmitter 204 and Receive 206 Antenna is used. In this event, an electronic method of canceling the transmitted signal from that received by the receiver chain is needed; this could be accomplished by a device such as a Circulator.) Using the same Radio Signal Source 201 as used in the transmit chain means the demodulation to IF is done using Homodyne detection; this has advantages in that it greatly reduces phase noise in the receiver circuits. The Mixer 208 then sends a Demodulated Signal 209—if using a Quadrature Mixer, it sends both I (in phase) and Q (quadrature) signals—into Filter/Amplifier 210 to properly filter the Demodulated Signal 209. The resulting filtered signal—then typically an Information Signal 211 carried on an IF subcarrier—is then demodulated from the subcarrier in the Subcarrier Demodulator 212, which then sends the Information Signal 213 to Processor 200 to determine the content of the message. The I and Q channels of Signal 209 can be combined in the Filter/Amplifier 210, or in the Subcarrier Demodulator 212, or they could be combined in the Processor 200. Common practice would utilize error detection in both messages sent over the link from the Interrogator 103 to the Tag 105, and also over the link from the Tag 105 to the Interrogator 103.

Using the above techniques as an example, an inexpensive, short-range, bi-directional digital radio communications channel is implemented. These techniques are inexpensive as the components consist of (for example) a Schottky diode, an amplifier to boost the signal strength, bit and frame synchronization circuits, an inexpensive 4- or 8-bit microprocessor, subcarrier generation circuits, and a battery. Most of these items are already manufactured in quantities of millions for other applications, and thus are not overly expensive. The circuits mentioned above for bit and frame synchronization and for subcarrier generation can be implemented in custom logic surrounding the microprocessor core; thus, except for a relatively small amount of chip real estate, these functions come almost "for free." Such circuitry is, illustratively, described in the previously referenced patent application Ser. No. 08/206,075 and in the pending U.S. patent application Ser. No. 08/409,782 entitled "Detector And Modulator Circuits For Passive Microwave Links." now U.S. Pat. No. 5,598,169.

Full Duplex

In the prior art RFID systems, separation of the Downlink and Uplink functions by TDD is typically done since the MBS system requires a CW tone to modulate, and the RFID system could not be run in the Full Duplex mode since there would be interference between the Downlink signals and the Uplink signals. The present invention discloses how to enable an MBS system to be used in Full Duplex mode by utilizing a method for achieving synchronization and describes several embodiments to accomplish Full Duplex operation in an RFID system.

Synchronization

Figure 6:
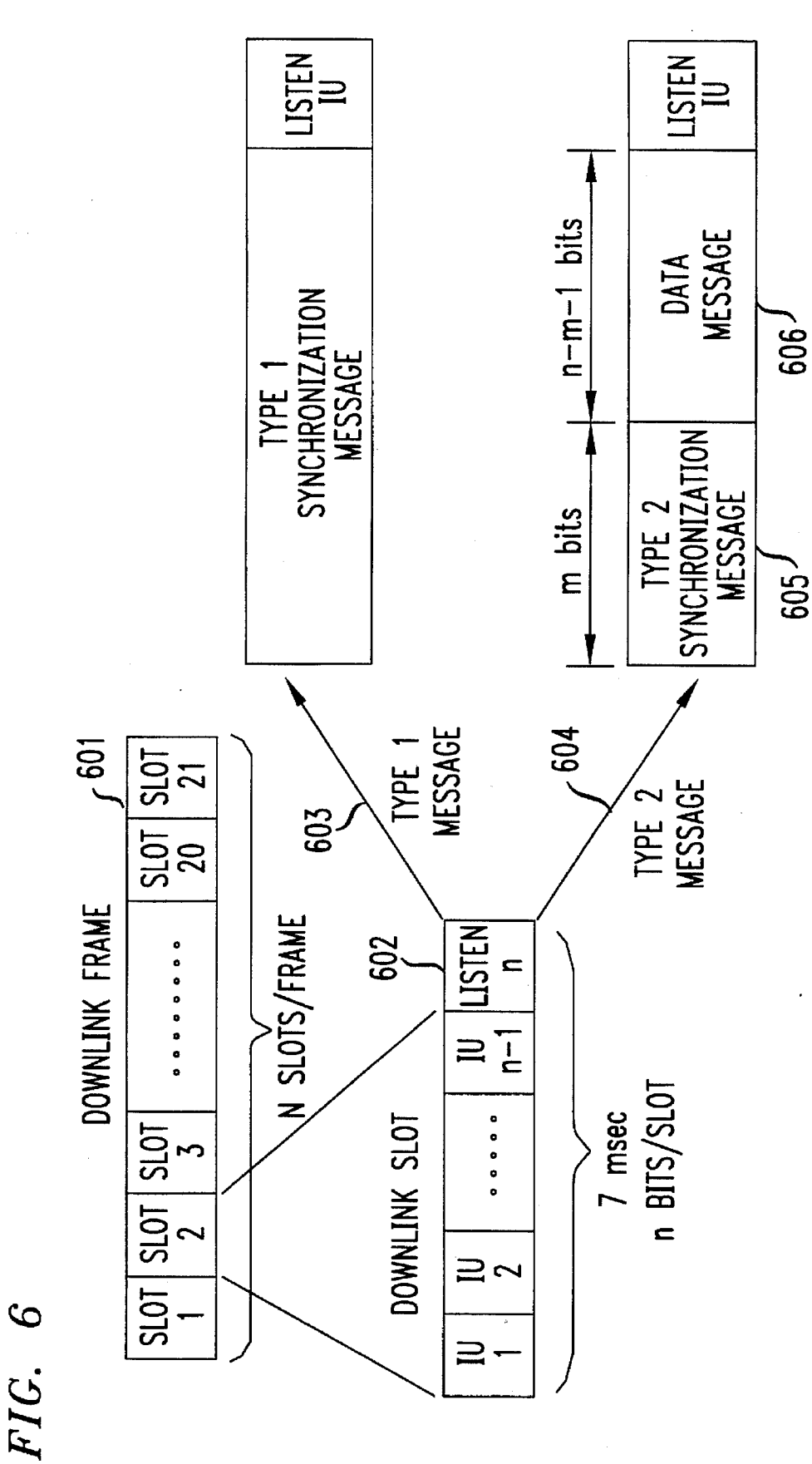
FIG. 6 shows a Downlink Frame Signal transmitted from an Interrogator Unit to a Tag Unit.

With reference to FIG. 6, a method is described for acquiring synchronization of the Downlink message within a relatively small number of Downlink bits. The Downlink messages are divided into Frames 601, and each Frame is divided into Slots. The following outlines a method for a Tag 105 to achieve Slot and Frame synchronization of the Downlink signals.

Figure 7:
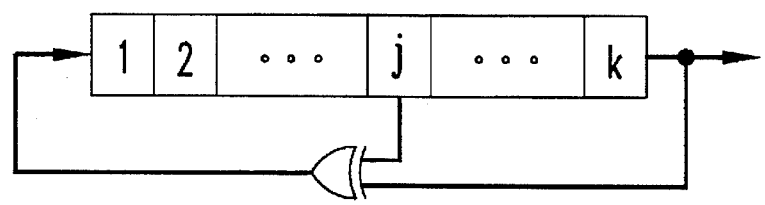
FIG. 7 shows a Pseudo-random Noise (PN) Generator.

Downlink Slot 602 has n bits/slot of which m-bits of the slot are reserved for Frame/Slot synchronization 605. The m-bits are derived from a Pseudo-random Noise (PN) Generator (FIG. 7) with a code length K. Each slot in the frame has a unique m-bit synchronization word derived from the K length PN code. Therefore, once the RFID Tag 105 synchronizes to the Downlink PN code, it will acquire both slot and frame timing.

After the Tag 105 has achieved bit synchronization, M shifted copies of the input serial bit stream are stored inside the Processor 305 using M registers. For the Downlink communications channel, there are N-slots/frame and n-bits/slot (FIG. 6), where m-bits/slot are reserved for Downlink frame synchronization. Therefore, in one frame there are N×M synchronization bits requiring a K length Pseudo-random (PN) Generator (FIG. 7) where $2^K-1=N\times m$, each offset by one bit (this is approximately K+M milliseconds (msec) of sampling and can be done in M bytes of SRAM). The M registers are configured with the same feedback taps of the original PN Generator used to generate the Downlink synchronization bits by the Interrogator. After sampling enough channel bits to fill the M registers (typically K bits), each register computes the next bit of the PN sequence and compares its output to the next channel bit sampled. This procedure is repeated until one register has successfully predicted the last L channel bits sampled (L is a design parameter that will trade synchronization time for false synchronization detection). Once this is accomplished, the Tag now has knowledge of both slot and frame synchronization by the value of the PN sequence in the winning register. It is the job of the Tag designer to decide the values of parameters N, M, n, m, L and K, given the desired throughput of the RFID system and the Bit Error Rate (BER) of the radio channel.

The Processor 405 can further enhance the operation of the Clock Recovery Circuit 404 by storing the time of occurrence of a sample timing bit used to acquire bit synchronization. After the Recovery Circuit and Processor have determined the proper timing of the Downlink bit stream from the sampled time bits, the Processor can then decode the first modulation bit stream from the same sampled timing bits. This allows faster and more accurate demodulation of the first modulation signal by eliminating the need to re-sample the first modulation bit stream which will add both additional delay and additional offset between the Downlink and Tag clocks.

For illustrative purposes, let us consider a Downlink frame consisting of N=21 slots, where each slot (e.g., 601) contains n=7 Manchester encoded Information Units (IUs) (e.g., bits) at 1 Kb/s; thus, 1 bit=1 millisecond. We describe two methods in which synchronization bits can be allocated in the Downlink bit stream. First, every bit (IU 1 ... IU 6) except one (Listen IU) is used as a synchronization bit and is derived from the output of a PN sequence shift register. The single remaining bit is used as a "Listen" bit. Such a Synchronization Message type is shown by 603. These synchronization bits allow very fast Slot and Frame alignment. (Before slot synchronization can be acquired, bit synchronization must be maintained.) Even with a Bit Error Rate (BER) of $10^{-1}$, this synchronization process should take less than 30 milliseconds.

However, using Message Type 603 no information can be transmitted in the Downlink. Using a data Message Type 604, however, only a few bits (e.g., m=2) are allocated for Synchronization (or more generally control signals) 605 and the rest (e.g., 4) 606 for a data message. Using Message Type 604, a penalty in synchronization time is incurred since a longer period of time is necessary to collect enough synchronization bits to compare to the known synchronization sequence. Note that both Message Types can be used together. Normally the Downlink message will use almost all the bits for synchronization bits (except for the Listen bit) and Tags will only be able to acquire initial synchronization during this mode.

When the Interrogator 103 needs to communicate with a Tag 105, it will first inform the Tag that a Downlink message is coming by raising the Listen bit in the last Synchronization Message 603. In the subsequent Message 604, the Interrogator uses the first two bits for synchronization and the next four bits for messaging. The two synchronization bits in this mode are used to maintain synchronization for Tags that are communicating with the Interrogator or Tags that have synchronization and are in the process of transmitting their mandatory Uplink message or information. The price paid by this synchronization method is that Tags that enter the communication zone will have to pay a large time penalty to acquire synchronization. However, when the Interrogator is in Full Duplex communication with a particular Tag, the remaining Tags cannot use the RF channel anyway. Therefore, applications requiring extremely fast synchronization time are not disqualified by this invention. Note that in environments that do not require fast synchronization times, the slower (two-bit) method can be used all the time. Therefore, applications that require Full Duplex all the time are not disqualified by this air interface protocol.

When the Interrogator 103 wants to communicate with a specific Tag 105, it will set the Listen bit, and in the next Slot it only fills the first two bits with synchronization bits (the two most significant bits out of the PN register) and places the address of the desired RFID Tag in the message field. (It will use the next N slots to place the N/2-byte message in the 4-bit message field). The Interrogator 103 then clears the Listen bit and in the next Slot resumes the fast synchronization format. A Tag 105 that has already acquired synchronization can use the two synchronization bits to maintain synchronization during the Full Duplex messaging mode of the Downlink. This is achieved by properly decoding the Listen bit.

Partial AM Modulation

Figure 8:
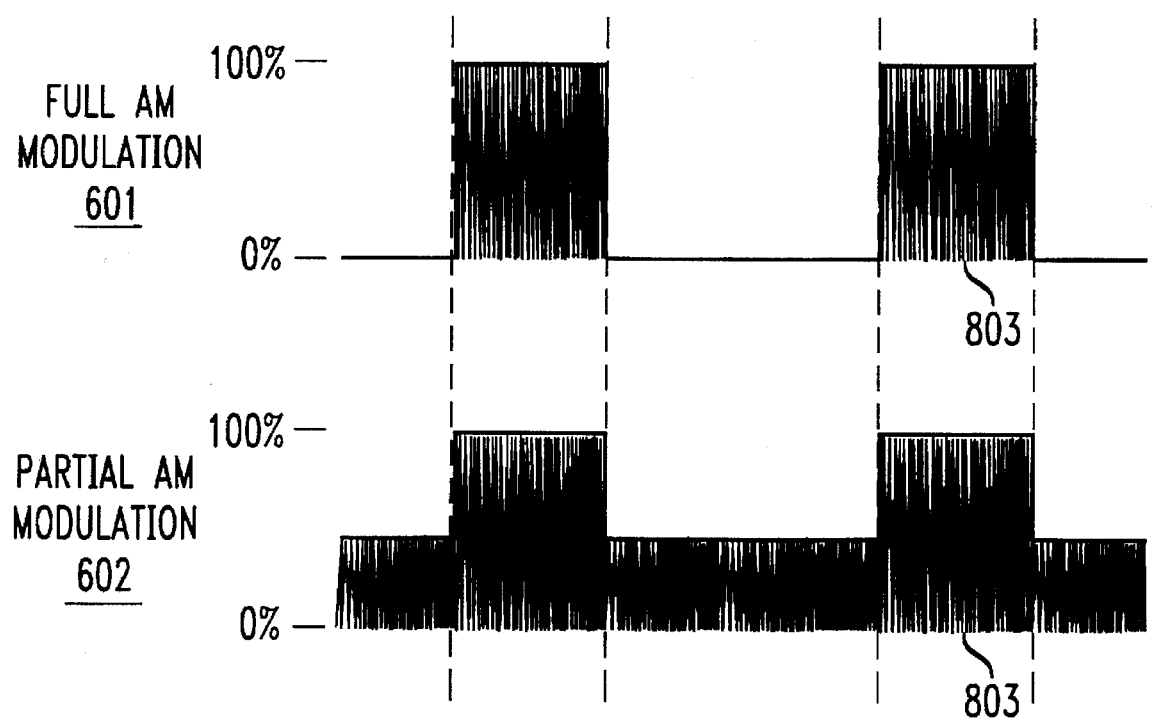
FIG. 8 shows a Full and Partial Modulation of Downlink Frame Signals.

The first mechanism to achieve Full Duplex is called Partial AM Modulation and is achieved as follows. With reference to FIG. 8, in the prior art, the Downlink signals were sent using amplitude modulation with a 100% Modulation Index 801, meaning that the Transmitter was turned completely "off" and then completely "on" according to the required data rate and modulation scheme. Thus, assuming the amplitude modulated signal used Manchester encoding, the Interrogator signal was completely on for half of the time, and completely off for half of the time. Thus, for Full Duplex operation, only some of the Uplink bits would have a CW tone present during the time it came for them to be transmitted. In Partial AM Modulation (802), the Downlink signals are transmitted with an "on" being 100% on (e.g., the Interrogator 103 transmitting at the full power level) and with an "off" being at an intermediate, but not zero, power level—perhaps 50% power. Thus, the Downlink signals are amplitude modulated, but in such a way that the carrier is always fully or partially present. In the above example, the Downlink signal-to-noise ratio would be reduced by 3 dB (since the "off" signal is transmitting at 50% power level).

Once synchronization is achieved (as described above), and the Tag 105 knows when it should send back its data, the Tag 105 uses a modulation scheme which is not directly sensitive to the amplitude changes in the received Downlink signal—such as Phase Shift Keying (PSK). The PSK signals can be sent during the time that the Downlink signals are being received. The modulated Downlink Carrier 803 is used as the "local oscillator". Signal 214 input to the Quadrature Mixer 208 of Interrogator 103; thus the phase noise rejection obtained by homodyne detection applies to the modulated signal.

To allow Partial AM Modulation to work, care must be taken with the selection of the Subcarrier Frequency 408 used to transmit the Uplink signal. This Subcarrier Frequency 408 must be chosen with a knowledge of the Downlink and the Uplink signal data rates in mind. The critical element is for the frequency of the Uplink signals to be sufficiently far away from the Downlink signals such that any reflected Downlink (e.g., MBS) signal from a Tag 105 can be adequately filtered out of the demodulated Uplink signal. The reflected Downlink signal will be received by the Interrogator, and will appear as (near) baseband noise at a few KHz away from the carrier frequency. This signal could be of sufficient amplitude to overpower the perhaps weaker Uplink signal at a higher subcarrier frequency. For some applications, the reflected Downlink signal near baseband must be reduced by about 150 dB in order to assure that the weaker uplink signal can be heard. One way to accomplish this degree of reduction is for the Interrogator 103 to have separate Transmit and Receive Antennas (e.g., 204 and 206) and for those Antennas to have about 40 dB of isolation. This isolation can be easily achieved by physically separating the Antennas, or by having some sort of barrier between them, etc. Beyond Antenna isolation, the Filter Amplifier (see 210 of FIG. 2) must guarantee that at least 110 dB of rejection (150 minus 40) is obtained from the subcarrier frequency down to baseband. For certain applications, subcarrier frequency of about 250 KHz or greater may be desirable and straightforward filter designs can achieve the required rejection (a 3-Pole filter is sufficient).

Intercalated Uplink

Figure 9:
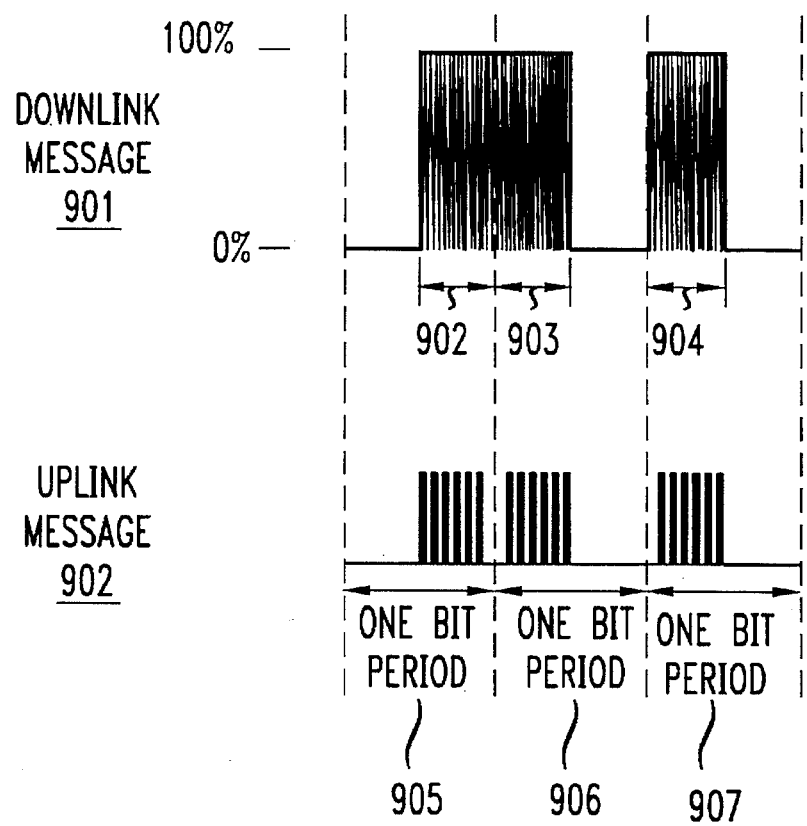
FIG. 9 shows a Manchester encoded Downlink Frame Signal and an Uplink Message Signal.

According to another aspect of the present invention, Full Duplex operation may be achieved using a technique called Intercalated Uplink, which in this case uses the fact that the Downlink data rate is low in comparison to the Uplink data rate. The Intercalated Uplink method is pictorially described in FIG. 9. (FIG. 9 is drawn under the assumption that the low bit rate Downlink Signal (or Message) 901 is using Manchester encoding; however, that is not critical to this portion of the Intercalated Uplink method.) In this method, we assume that the Downlink Message Signals 901 are amplitude modulated in the traditional manner—that is, "on" is 100% power, and an "off" has 0% transmit power. We note that the Interrogator 103 knows when the Downlink Signal 901 is "on" and when it is "off". Thus, the Tag 105 can send Uplink bits during the time periods (902–904) when the Downlink Signal 901 is "on". The Uplink modulation scheme is not relevant here—it could be any classical modulation scheme. Also, it is not necessary for an entire Uplink message 902 to be transmitted within the Downlink "on" period of one bit (e.g., 905); it would be perfectly acceptable for the Uplink signal to be scattered through successive "on" periods of several bit periods (905–907).

Finally, we note that the Tag 105 need not only send data during the time periods that the Downlink signal is "on" (e.g., during 902–904). Again, referring to FIG. 9, let us assume that the Downlink signal is amplitude modulated, as discussed above, and also Manchester encoded. Thus, during each bit period 905–907, the Downlink signal is "on" for half of the bit period, and "off" for half of the bit period. The Tag 105 can simply send the same set of bits—as many bits as will fit into one-half of the bit period—twice within the bit period. Since the Interrogator 103 knows when the Downlink signal is "on", it would be a simple matter for the Interrogator to know exactly when to listen for the valid Uplink bits and when to disregard any received signal (which would certainly be noise, since the Downlink transmitter was "off") when the Downlink signal is "off".

Figure 10:
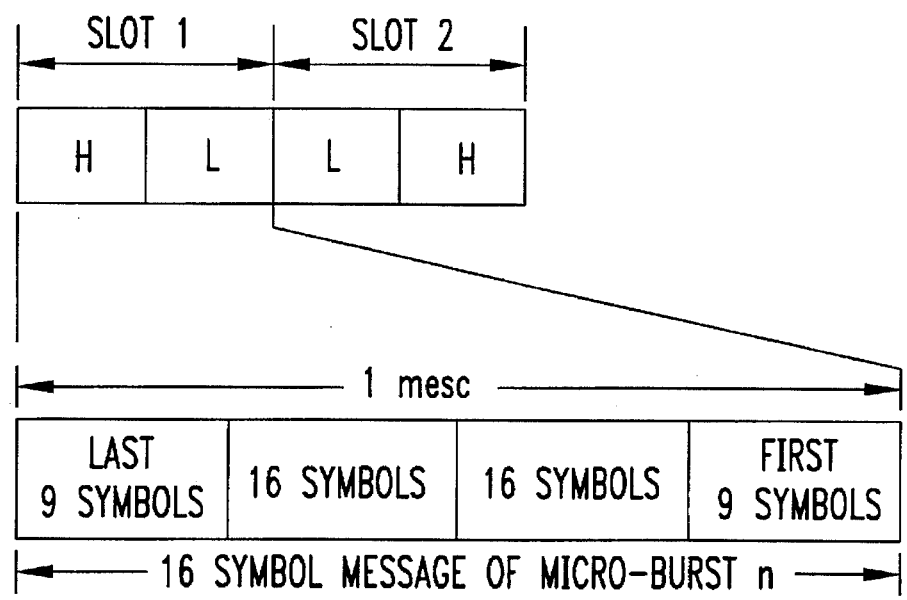
FIG. 10 shows a Manchester encoded Downlink Frame Signal and a duplicated-plus-rotated Uplink Message Signal.

FIG. 10 shows two bits (bit 1 and bit 2) of a Manchester encoded Downlink Frame Signal 1001 (where each Manchester bit has a high H and low L segment). FIG. 10 also shows a duplicated-plus-rotated bit of an Uplink Message Signal 1002. FIG. 10 shows that the Tag may produce rotations in the Uplink Message Signal 1002 by not knowing when the Downlink 1001 will turn "on" or "off". The Uplink Message Signal 1002 will contain synchronization bits (e.g., a well-known Barker sequence) that will aid the Interrogator in re-assembling the Uplink message.

Combined Modulation Techniques

According to another aspect of the present invention, it is possible to combine different modulation schemes in the Downlink and in the Uplink to accomplish Full Duplex operation. For example, in FIG. 2, the Modulator 202 could utilize Phase Modulation. This, of course, would require a somewhat more complex receiver in the Tag 105 (in FIG. 4, the Detector/Modulator 402 would be more complex and include a radio receiver capable of detecting phase modulated signals). In the Uplink, the Tag 105 could utilize Modulated Backscatter (MBS) with a phase modulated signal as the signal to be modulated and backscattered. One specific implementation, for example, could utilize Binary Phase Shift Keying (BPSK) in the Downlink and utilize Frequency Shift Keying (see FIG. 5) in the Uplink using MBS. Another implementation would utilize BPSK in the Downlink and Amplitude Modulation (AM) in the Uplink using MBS.

In the case that the Downlink data rate is much smaller than the Uplink data rate, it is possible to combine PSK modulation in the Downlink with PSK modulation in the Uplink, using the Intercalated Uplink method disclosed above.

What has been described is merely illustrative of the application of the principles of the present invention. Other arrangements and methods can be implemented by those skilled in the art without departing from the spirit and scope of the present invention.

We claim:

1. A radio communication system comprising
   an interrogator including
   means for generating a first modulated signal by modulating a first information signal onto a radio carrier signal;
   means for transmitting said first modulated signal to at least one tag,
   said at least one tag including
   means for receiving said first modulated signal at an antenna,
   backscatter modulator means for modulating the reflection of said first modulated signal from the antenna using a second information signal, thereby forming a second modulated signal which is the reflected first modulated signal which has been further modulated by the second information signal during a period of time when the first information signal is present on the first modulated signal;
   said interrogator further including
   means for demodulating a received second modulated signal, to obtain said second information signal.

2. The radio communication system of claim 1 wherein said first modulated signal is generated using a first modulation type selected from a group including at least amplitude, phase, frequency, time-division, and code-division modulation types.

3. The radio communication system of claim 1 wherein said second modulated signal is generated using a second modulation type selected from a group including at least amplitude, phase, frequency, time-division, and code-division modulation types.

4. The radio communication system of claim 1 wherein the interrogator demodulating means includes a homodyne detector using said first modulated signal as the frequency source.

5. The radio communication system of claim 1 wherein the receiving means includes means for decoding the received first modulated signal to obtain one or more message slots, at least one message slot including a message segment and a control segment.

6. The radio communication system of claim 5 wherein at least one message segment includes a synchronization message for use in synchronizing said at least one tag to the received first modulation signal.

7. The radio communication system of claim 6 wherein the at least one message segment further includes a data segment.

8. The radio communication system of claim 5 wherein the receiving means further includes
   means for synchronizing the receiving means to the one or more message slots by Exclusive-OR -ing data bits of at least one pair of two or more message slots.

9. The radio communication system of claim 8 wherein the receiving means further includes
   means, responsive to achieving synchronization by said synchronization means, for extracting from a subsequently received message slot a first message including a
   1) synchronization message for synchronizing the receiver means with the beginning of the subsequently received message slot and
   2) control message for indicating whether the receiving means should be in a listen mode.

10. The radio communication system of claim 8 wherein the receiving means further includes
    means, responsive to achieving synchronization by said synchronization means, for extracting from a subsequently received message slot a second message including a
    1) synchronization message for synchronizing the receiver means with the beginning of the subsequently received message slot,
    2) control message for indicating whether the receiving means should be in a listening mode and
    3) data message containing information for that tag.

11. The radio communication system of claim 9 or 10
    wherein when the control message is set to a first state, it directs that tag to listen for a first message in a subsequently received slot immediately following the present slot and
    wherein when the control message is set to a second state, it directs that tag to listen for a second message in a subsequently received slot immediately following the present slot.

12. The radio communication system of claim 1 wherein the receiving means further includes
    means for acquiring timing synchronization and decoding data from the first modulation signal.

13. The radio communication system of claim 1 wherein the first modulated signal is an amplitude modulated signal and utilizes on/off keying.

14. The radio communication system of claim 13 wherein at least one tag further includes
    means for detecting when the on/off keying is in an on state for enabling the backscatter modulator and for disabling the backscatter modulator when the on/off keying is in an off state.

15. The radio communication system of claim 13 wherein the on/off keying utilizes Manchester encoding.

16. The radio communication system of claim 13 wherein said first modulation type is partial amplitude modulation utilizing amplitude shift keying (ASK), wherein said tag further includes means for detecting ASK modulation, and means for enabling the backscatter modulator and for imposing a second modulated signal onto said first ASK modulated signal.

17. The radio communication system of claim 13 wherein at least one of said tags further includes means to generate a second modulated signal during the on states and an identical repetitive second modulated signal during the off states and wherein said backscatter modulator means is enabled during the on and off states.

18. The radio communication system of claim 13 wherein at least one of said tags further includes means to generate a second modulated signal and an identical repetitive second modulation signal with a fixed offset between those signals.

19. The radio communication system of claim 1 wherein the second information signal encodes a logic zero state as a first pseudo-random pattern of bits and encodes a logic one state as a different, second pseudo-random pattern of bits that is essentially orthogonal to the first pseudo-random pattern, and wherein said receiving means includes means for recovering said second information signal from said first and second pseudo-random patterns of bits received in said first modulated signal.

20. A tag for use in a radio communication system, comprising means for receiving a first modulated signal at an antenna, and backscatter modulator means for modulating the reflection of said first modulated signal from the antenna using a second information signal, thereby forming a second modulated signal which is the reflected first modulated signal which has been further modulated by the second information signal during a period of time when the first information signal is present on the first modulated signal.

21. A method of operating a radio communication system comprising the steps of generating, at an interrogator, a first modulated signal by modulating a first information signal onto a radio carrier signal;

transmitting said first modulated signal to at least one tag;

at said at least one tag receiving said first modulated signal at an antenna, modulating, using a backscatter modulator, the reflection of said first modulated signal from the antenna using a second information signal, thereby forming a second modulated signal which is the reflected first modulated signal which has been further modulated by the second information signal during a period of time when the first information signal is present on the first modulated signal;

demodulating, at said interrogator, a received second modulated signal, to obtain said second information signal.

22. A method of operating a tag for use in a radio communication system, comprising the steps of receiving a first modulated signal at an antenna, and modulating, using a backscatter modulator, the reflection of said first modulated signal from the antenna using a second information signal, thereby forming a second modulated signal which is the reflected first modulated signal which has been further modulated by the second information signal during a period of time when the first information signal is present on the first modulated signal.

* * * * *